Patented Oct. 23, 1934

1,977,940

UNITED STATES PATENT OFFICE

1,977,940

SOUND RECORD COMPOSITION AND METHOD OF MAKING

Fritz Frank, Berlin, Germany, assignor to the firms Hanseatische Mühlenwerke Aktiengesellschaft, Hamburg, Germany, and Polyphonwerke Aktiengesellschaft, Berlin, Germany No Drawing. Application August 17, 1932, Serial No. 629,243. In Germany August 17, 1931

3 Claims. (Cl. 106—1.5)

The invention relates to a method for the manufacture of moulded products, particularly gramophone records, from natural or artificial resins and the like.

Gramophone records which have been made according to the usual method by moulding natural or artificial resins together with fillers of various kinds exhibit various disadvantages. Thus for example in certain cases the pressed resins bloom or in consequence of non-uniform distribution in the mixing or pressing of the mass or in consequence of a subsequent dissociation of the mixture, extraneous crackling noises become apparent when the record is played.

It has been endeavoured to overcome these very disturbing disadvantages in the most diverse ways. Thus for example it has been endeavoured to overcome the difficulties by using fillers of the smallest possible particle size and by working the material which is to be pressed to an extreme degree of fineness. Further homogenizing additions have been made, such as certain copal resins for example, which were moulded together with the other resins.

However, all these endeavours have met with only limited success. The difficulties indicated always arise in an unexpected and uncontrollable manner.

Now it has been found, that phosphatides, which also are designated as lecithin, lepids or lepins have an extremely great homogenizing capacity and that this advantageous property becomes apparent very particularly in moulded materials of the kind referred to which are used particularly for the manufacture of gramophone records. The addition of phosphatides and/or lecithin has always been found to be successful with the most diverse materials which are used for moulding. It is also very effective in the case of the flexible records, which contain cellulose esters for example. In accordance with the invention gramophone records can be obtained which are free from side noises.

Phosphatides and lecithin which are obtained in the raw state in the treatment of soya beans are primarily used. In a similar way, however, the phosphatides from all other suitable raw materials such as egg-yolk, lupins and other vegetable or animal material can be used.

The phosphatides and/or lecithins can be added to the inorganic filler component of the mass for the moulding of the record and then ground or kneaded in the usual way with the resinous materials. The addition can, however, equally well be made to the resins with careful warming or by kneading or mixing operations.

It is preferable to free the raw phosphatides and lecithins to a greater or less extent from the impurities and particularly from the oleaginous materials by one of the known methods prior to the final mixing operation. Thus for example the material may be subjected to washing with cold or lukewarm acetone.

A simpler method is first to mix the raw phosphatide or lecithin materials with one or more of the inorganic fillers and then to remove the oil therefrom while in this mixture, in which they offer a large surface, the oil removal being carried to such an extent with acetone or another suitable solvent as is required by the desired moulding operation. This mode of operation has the advantage that the solvent is removed satisfactorily and readily from the mixture which readily can be spread out and dried without considerable heating.

The quantities which are used for homogenizing the mixes for record moulding are small. In accordance with the nature of the product of the mixing operation they vary between less than 1% of the total weight of the mixture and several per cent. by weight.

I claim:

1. Method for the production of gramophone records by moulding resinous plastics and fillers including the step of treating raw phosphatides with solvents so as to dissolve essentially oil impurities, removing solvent and solution from the raw phosphatide and incorporating the raw phosphatide in the mix of resinous plastic prior to moulding.

2. Method for the production of gramophone records by moulding which includes the step of mixing phosphatide and filler treating the mixture with solvent to remove oily constituents and adding the treated mixture to resinous plastic.

3. A sound record formed of a composition comprising a resinous plastic and a filler, and containing a phosphatide, such composition being substantially free of oil.

FRITZ FRANK.